Jan. 10, 1967 J. L. KERSEY, JR., ET AL 3,297,179
CAR DUMP ASSEMBLIES
Filed Sept. 1, 1964 4 Sheets-Sheet 1
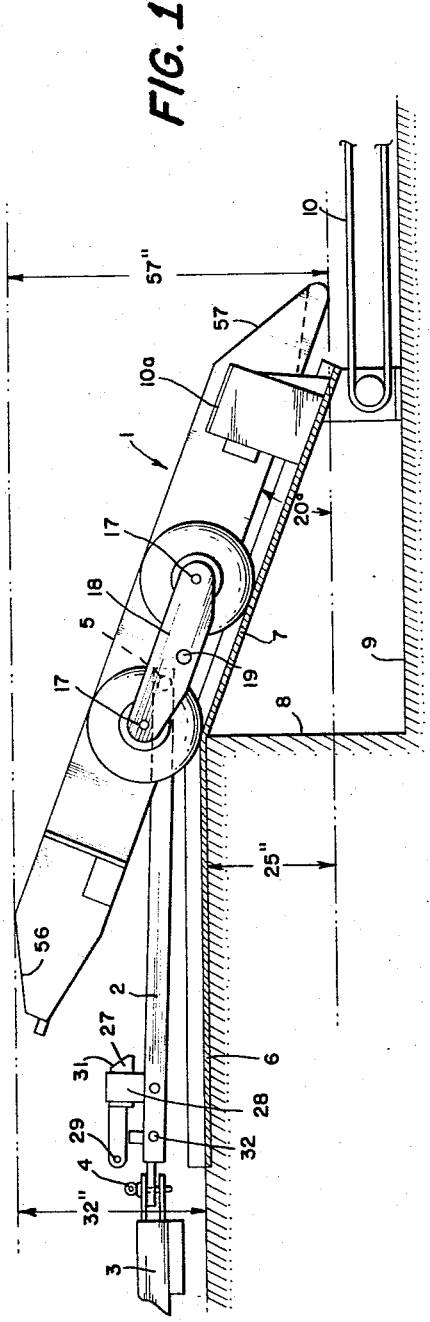
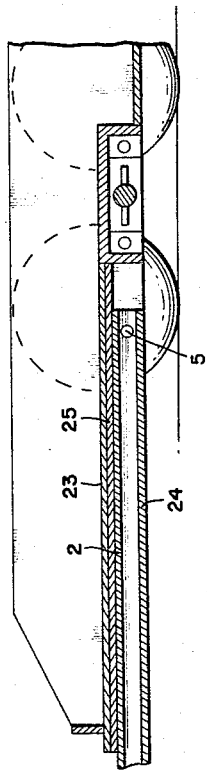
INVENTORS
FRANK N. KERSEY
JOHN L. KERSEY, JR.
TRENT H. KEMP
BY *Ralph L. Bassett*
ATTORNEY Jan. 10, 1967  J. L. KERSEY, JR., ET AL  3,297,179
CAR DUMP ASSEMBLIES
Filed Sept. 1, 1964  4 Sheets-Sheet 2
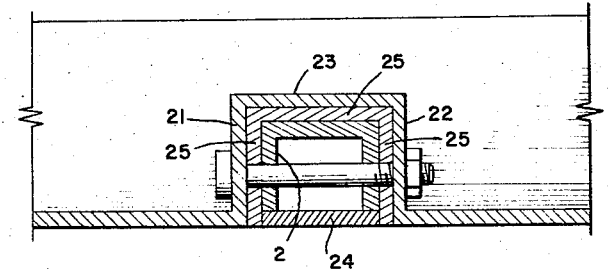
FIG.6
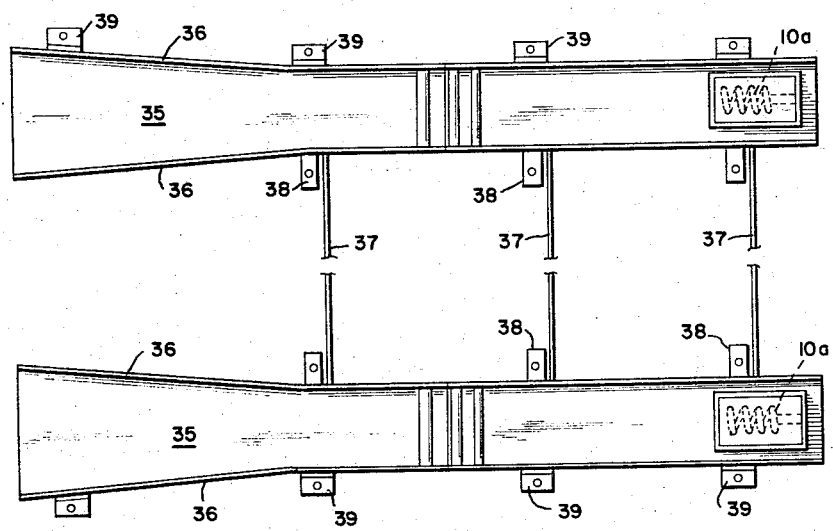
FIG.2
FIG.3
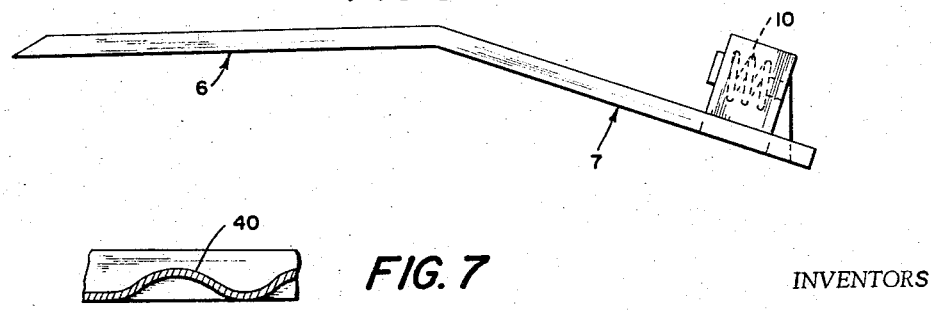
FIG.7
INVENTORS
FRANK N. KERSEY
JOHN L. KERSEY, JR.
TRENT H. KEMP
BY Ralph L. Bassett ATTORNEY

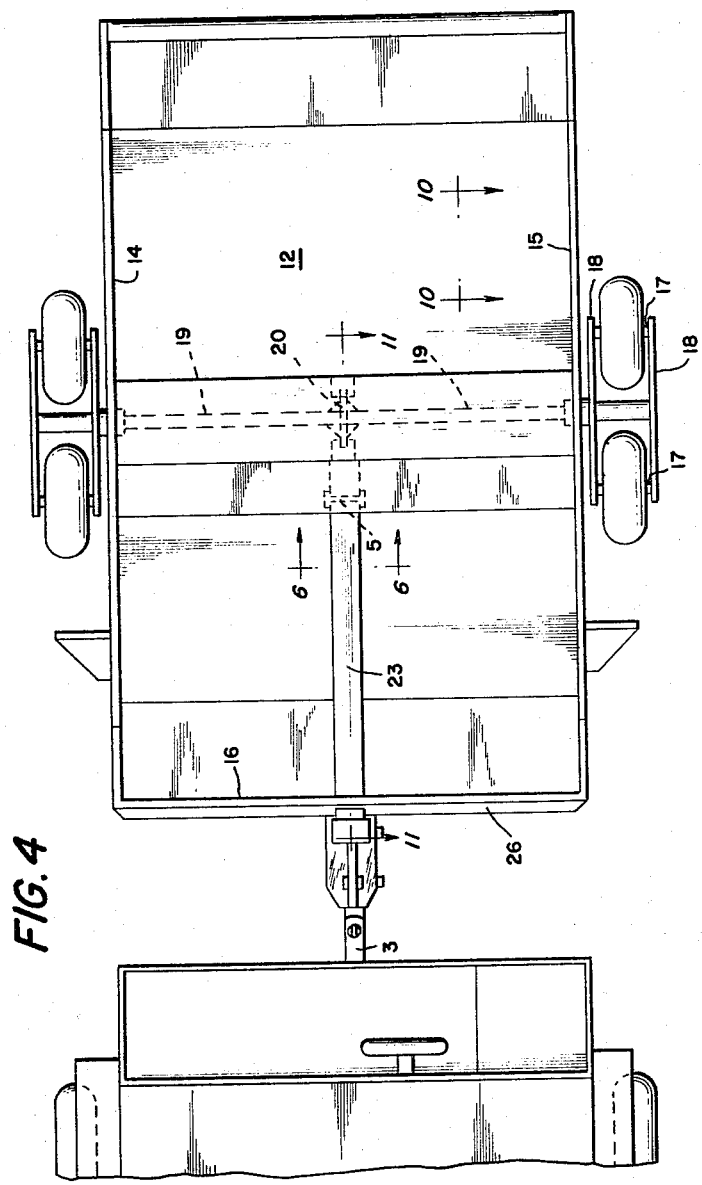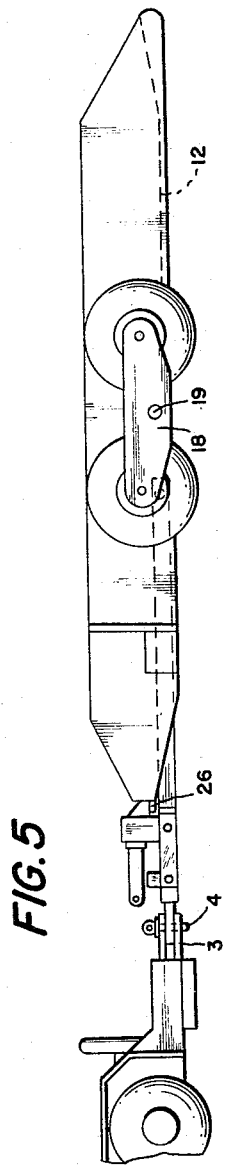

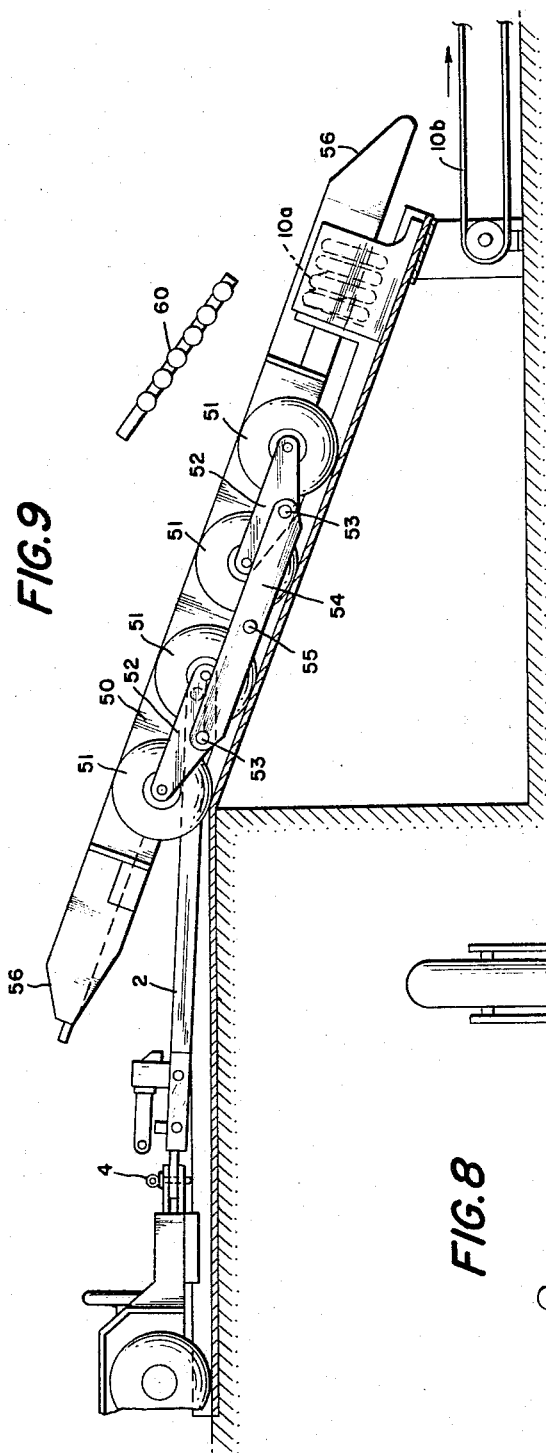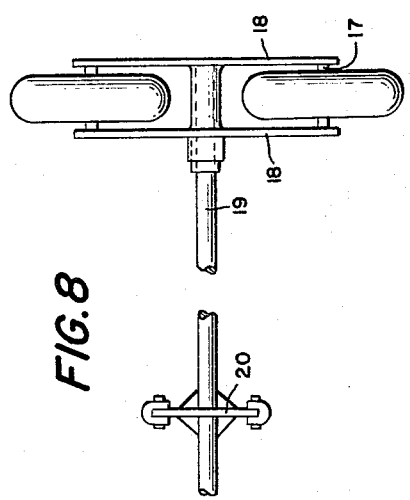

United States Patent Office 3,297,179
Patented Jan. 10, 1967

3,297,179
CAR DUMP ASSEMBLIES
John L. Kersey, Jr., Frank N. Kersey, and Trent H. Kemp, Bluefield, Va., assignors to "Automatic" Sprinkler Corporation of America, Youngstown, Ohio, a corporation of Ohio
Filed Sept. 1, 1964, Ser. No. 393,635
18 Claims. (Cl. 214—64.2)

This invention relates to a car dump assembly particularly for use in underground mines and comprehends a trackless portable dump car pulled by a mine tractor and including the use of resilient tires medially supported on torque rods, the assembly further including means for tilting the car and imparting forces to the car for projecting lading therefrom.

One of the objects of the invention is to provide an uncoupling arrangement for a trailer type dump car actuated from a mine tractor, whereby the dumping operation is performed without the necessity of uncoupling the loaded car from the tractor.

Another object of the invention is to provide automatic positive means for tipping the loaded car as it is moved to a position on a dump assembly.

Another object of the invention is to provide means for shaking the car and imparting other motion thereto while the same is being moved to tilted position and after the tilting motion to facilitate the unloading of the lading.

Another object of the invention is to provide positive means for automatically returning the car after the unloading operation to a horizontal locked position without the use of an auxiliary mechanism.

A further object of the invention is to provide manual means for unlocking the car when in loaded position and prior to movement to the dump and for locking the car when it is returned from the dumping position to a horizontal position.

More specifically, the invention comprehends a structure and association of parts whereby an open-ended trackless portable dump car may be fully and completely unloaded when in a tilted position approximately 20 degrees from the horizontal by utilizing inertia and low coefficient friction material, thereby decreasing the amount of head room normally required for such operations.

This invention further comprehends the use of a dump including a pair of flaring channels for facilitating entrance of the trackless portable car and angularly disposed channel extensions arranged at approximately 20 degrees for movement of one or more of the supporting car wheels, whereby the car after being released from its horizontal position is quickly shifted to an angle of 20 degrees and moved against spring loaded stops to provide unloading inertia for the discharge of the lading.

These and other objects of the invention, such as the use of torque to facilitate the initiation of the movement of the car from horizontal to angular unloading position, will more clearly hereinafter appear by reference to the accompanying drawings forming a part of the instant specification and wherein like reference characters designate corresponding parts throughout the several views, in which:

FIG. 1 is a side elevation showing the assembly with the car in dumping position on the dump tracks;

FIG. 2 is a top plan view of the dump tracks;

FIG. 3 is a side elevation of the dump tracks;

FIG. 4 is a top plan view of the car;

FIG. 5 is a side elevation of the disclosure of FIG. 4 with the car connected to a tractor;

FIG. 6 is a sectional view on line 6—6 of FIG. 4;

FIG. 7 is a fragmentary section showing a modification of a track portion;

FIG. 8 is a detailed view of the torque rod wheel mounting;

FIG. 9 is a side elevation of an assembly utilizing a modified form of wheel mount;

FIG. 10 is an enlarged transverse sectional view of a floor sheet structure; and FIG. 11 is a vertical section on line 11—11 of FIG. 4.

Referring to FIG. 1 a dump assembly is illustrated comprehending the handling and discharge of lading from a car 1 traveled through draft bar 2 by a mine locomotive having its coupling extremity illustrated at 3, the locomotive being coupled to the draft rigging by a coupler pin 4 and the draft bar 2 being connected to the car by a pivot 5. The car 1 is shown on the dump tracks having horizontal portion 6 and angular extremity 7. The conveyor pit defined in part by wall 8 and bottom 9 is provided with appropriate endless conveyor mechanism 10 for receiving the lading from the open end of the mine car 1 when the latter is moved onto the inclined portion 7 of the dump tracks and against the stops 10$^a$ at the lower extremity of the dump tracks.

The preferred form of dump car is shown in FIGS. 4 and 5 and includes floor plates 12, side walls 14 and 15 and end wall 16. The opposite end of the car is open to permit the free discharge of the lading when the car is inclined to lading discharge position. The car is mounted on tires carried on axles 17 between spaced plates 18 fixed to torque rod 19 extending transversely of the car, it being understood that a single torque rod can be used and fixed at its medial point 20 or separate torque rods can be used fixed medially of the car and projecting outwardly and laterally of the car for supporting the wheels and wheel mounts.

The structure and mounting of the torque rod assembly is shown in our co-pending application Ser. No. 317,874, filed October 18, 1963, now Patent No. 3,241,855, and is illustrated in detail in FIG. 8 of the instant application. It is important to note in connection with the wheel mountings on the torque rods 19 that these torque rods contemplate an added function in the discharge of the lading on the dump and in this connection reference is made to FIG. 1 in which it will be seen that the car 1 and the wheel mountings inherently shift their relative positions to cause a winding of the torque rods carrying the wheels as the wheel mountings travel from the horizontal section of the dump tracks 6 to the inclined portion 7 of the dump tracks, and this winding or twisting of the torque rods due to the change in the position between the wheel and wheel mount and the car body causes an increased inertia in the travel of the car towards its angular dumping position.

The rear portion of the floor 12 of the car 1 is modified, as shown in FIGS. 6 and 11, to provide a vertically offset longitudinally extending medial portion in the floor sheet to accommodate the draft bar 2. The offset portion or elongated recess is defined by vertical walls 21 and 22 and top plate 23, this recess having dimensions for receiving the draft bar 2, which latter is of inverted U-form and is closed at its bottom by a transverse plate 24. A reinforcing liner in the form of an inverted channel is shown at 25 to reinforce the offset portion or recess provided in the floor structure. Thus, normally, when the car is in horizontal position the draft bar is received in the elongated longitudinal recess formed in the car floor and the recess provides a guide and positioning structure for the draft bar 2 and retains the car at all times against lateral motion and consequent damage from such motion. Also this novel arrangement of the draft bar, in association with the floor structure, provides a heavy reinforced support for the car body during its travel and particularly when under loaded horizontal condition.

At the outer end of the car, adjacent end wall 16, a transverse box frame is fixed at 26, this frame providing a reinforcement at the junction of the end wall, side walls and floor and also providing a horizontal structure for engaging a spring urged lock 27 mounted on the draft bar 2 by the frame 28 and having an operating extremity 29 and a limit stop 30. The top surface of the lock 27 is inclined at 31 so that the box frame 26 may pass over the spring lock 27 and move into locked engagement without manual operation when the car is swung from its inclined to its horizontal position after a loading operation. When the car is to be unloaded and immediately prior to its movement on the dump tracks to the inclined position, the lock 27 will be disengaged from the box frame 26 so that the car can swing freely and under its own inertia to a dumping position, it being of importance that the car travel with sufficient momentum to provide an unloading shock to facilitate the discharge of the lading.

In FIG. 10 a fragmentary section of the car floor is shown, this structure preferably being of conventional stainless clad metal approximating 1/4" in thickness with approximately 10% of its upper or floor surface providing a generally non-corrosive frictionless surface for the clean, quick movement of the lading when the car assembly is in inclined position, it being noted that the discharge position of the car with the present invention approximates an angle of 20 degrees and may be less, such angle of discharge being ample, due to the coefficient of friction provided by the new use of a novel floor structure. Obviously discharging lading at an angle of 20 degrees or less is of extreme importance in that it materially decreases the amount of head room required for dump car operations. As is well known in the art, the amount of labor and equipment normally used in mine operations is extremely expensive where the margin of profit is limited and efficiency is essentially one of the requirements of a successful operation.

Referring to FIGS. 2 and 3, the dump track is illustrated as comprising a pair of relatively wide channels 35 having upstanding side walls 36, these tracks being arranged parallel to each other and connected by transverse braces 37 anchored by pins extending through lateral projections 38 positioned at the junction of the braces and tracks and also projecting outwardly from the outer flanges of each of the tracks, as shown at 39. Each of these lateral projections 38 and 39 is formed with openings for receiving spikes or pins which are driven into the supporting surface. As noted by reference to FIG. 3, the horizontal portions 6 of the tracks flare outwardly towards their open ends and merge inwardly to the horizontal downwardly inclined portions 7 arranged in the present illustration at 20 degrees from the horizontal, although it is appreciated that a slight modification above or below this angle could be made without modifying the concept, which includes the novel frictionless flooring of the car, the inertia of the car under the functioning of the torque rods and the use of the resilient stops 10$^a$.

In FIG. 7 there is illustrated a portion of the track with undulations 40 which may be used to provide an additional jarring action of the car floor generally vertically of its direction of movement tend to lift the lading from the frictionless floor immediately prior to the impact of the car with the stops 10, it being apparent to one skilled in the art that a quick vertical movement of the car will tend to lift the lading and generally free any of the lading that may be inclined to adhere to the car floor due to the nature of the lading present where moisture conditions are abnormal. Also the spring stops 10$^a$ cause a slight reversal of direction of movement of the car and a sliding of the lading toward the discharge end of the car.

In FIG. 9 there is an illustration of a mine car unloading in which the car 50, constructed in accordance with the car body heretofore described, is mounted at each side on two pairs of tires 51, each pair of tires being supported on a pivoted link 52 with the links 52 pivoted at 53 on base plates 54 welded or otherwise fixed to the torque rod 55. The disclosure of this car corresponds to the disclosure in our prior application Serial No. 317,874, now Patent No. 3,241,855, and basically comprehends an assembly adapted to handle greater capacities of lading. As in the prior form of the invention, the lading is discharged onto an endless belt 10$^a$ in a pit provided for the positioning of the angular portion of the dump track and as in the case of the basic disclosure, the car is provided at each end of each side wall with angled extremities 56 and 57.

In FIG. 9, which illustrates the use of an extended car body structure, it may be desirable to add momentum and thus impact to the lading by providing an array of rolls or the like, as at 60, for engagement with the discharging end of the car as it moves to its unloading position. Such a facility may tend to create a vibration of the lading at approximately the time the car reaches its full angular position and at the moment of impact with the bumpers to create an initial lading movement throughout the entire lading body. This latter proposal is in addition to the use of the solid stops which are attached to the car and which mate with the spring loaded stops 10 on the dump tracks. All of the features involved, including the frictionless floor sheet structure, cooperate to build up momentum required for the discharge of the lading with the proposed minimum angular arrangement of the dump tracks.

It is to be understood that the movement of the car to its forward, downwardly tilted position terminating in impact with the stops 10 provide a shock to the lading which is materially increased because of the spring loaded stops, the latter tending to reverse the movement of the car and permitting inertia to unlock the lading and create turbulence in the lading structure resulting in total displacement of the lading from and away from the car body.

What is claimed is:

1. In combination, a haulage unit comprising a body structure including side wall portions and a floor, wheel mounting torque rods extending transversely of the floor and beneath the bottom of the floor medially of the haulage unit length, said torque rods extending laterally beyond the side walls of each side of said unit, means securing the torque rods to the car floor centrally of its length, mounting plates rigidly fixed to each of the torque rods outwardly of the side walls of the body structure and having laterally projecting end portions, means rigidly securing the mounting plates to the torque rods, spaced wheels mounted at the end portion of each of said plates, and a dump arrangement for said haulage unit comprising a pair of trackways having generally horizontal portions and downwardly extending angular portions, stop means at the extremities of the downwardly extending portions, and power means connected to the haulage unit for moving the same over the angular trackways, whereby the mounting plates will be partially rotated with their torque rods to apply inertia to the haulage unit when the latter is moved to inclined dumping position.

2. The structure of claim 1 characterized in that the connection between the power means and the haulage unit comprises a draft bar pivoted to the power means and pivoted to the haulage unit at a point spaced rearward of the torque rods.

3. The structure of claim 1 characterized in that the connection between the power means and the haulage unit comprises a draft bar pivoted to the power means and pivoted to the haulage unit at a point spaced rearward of the torque rods, said draft bar being in channel form and seating in a longitudinally formed recess in the haulage unit when the haulage unit and power means are traveling in a horizontal plane.

4. The structure of claim 1 characterized in that the connection between the power means and the haulage unit comprises a draft bar pivoted to the power means and pivoted to the haulage unit at a point spaced rearward of the torque rods, said draft bar being in inverted channel form and seating in a longitudinally formed recess in the haulage unit when the haulage unit and power means are traveling in a horizontal plane.

5. The structure of claim 1 characterized in that the stop means at the extremities of the downwardly extending portions of the trackways includes spring means normally resisting impact which engage laterally projecting stops extending from the side walls of the haulage unit.

6. The structure of claim 1 characterized in that the draft bar connects the power means with the haulage unit and a spring lock is mounted on the draft bar and engages a projecting portion of the haulage unit to retain the same in normal horizontal position.

7. The structure of claim 1 characterized in that the draft bar connects the power means with the haulage unit and a manually operated spring lock is mounted on the draft bar and engages a projecting portion of the haulage unit to retain the same in normal horizontal position.

8. The structure of claim 1 characterized in that means are carried by the angular portions of the trackways for vibrating the haulage unit prior to the engagement of the haulage unit with the stop means on the trackways.

9. A dump structure for a haulage unit mounted on a supporting frame including wheels, said haulage unit comprising a body structure including side wall portions and a floor, means mounting said body structure on said frame to pivot about a transverse axis with respect thereto, said haulage unit being motivated by a power means connected thereto by a pivoted draft bar, said draft bar being pivoted to the haulage unit at a point spaced rearwardly of said transverse axis, said dump structure including a trackway having a horizontal portion and a downwardly inclined portion including spring stop means at its lower extremity, and said downwardly inclined portion of said trackway being a fixed continuation of said horizontal portion.

10. The structure of claim 9 characterized in that the trackway includes undulations to be engaged by the supporting wheels of the haulage unit prior to the engagement with the stop means.

11. The structure of claim 9 characterized in that means are provided for facilitating the tilting motion of the haulage unit over the inclined portion of the trackway.

12. The structure of claim 9 characterized in that the horizontal portion of the trackway has converging walls.

13. The structure of claim 9 characterized in that the horizontal portion of the trackway includes converging side walls and the trackway is connected by a plurality of transverse tie rods.

14. The structure of claim 9 characterized in that the horizontal portion of the trackway includes converging side walls and the trackway is connected by a plurality of transverse tie rods connected with the trackway by horizontal plates provided with perforations for receiving securing means.

15. In a haulage unit comprising a body structure including side wall portions and a floor, substantially aligned wheel mounting torque rods extending transversely of the floor and beneath the bottom of the floor medially of the haulage unit length, said torque rods extending laterally beyond the side walls of each side of said unit, means securing the torque rods to the car floor centrally of its length, mounting plates rigidly fixed to each of the torque rods outwardly of the side walls of the car body, means rigidly securing the mounting plates to the torque rods, spaced wheels mounted at the end portions of each of said plates, said car floor rearward of the torque rods having a centrally located longitudinally extending medially upstanding channelway opening downwardly, a draft bar normally snugly seated in the channelway to prevent lateral relative movement and pivoted at its forward end rearward of said torque rods by means extending through the walls of the channelway, said draft bar projecting outwardly of the rear end of the haulage unit, and a coupler means connected to the outer free end of said draft bar.

16. The structure of claim 15 characterized in that the draft bar is of inverted channel form and the channel is closed by a plate throughout the major portion of its length.

17. The structure of claim 15 characterized in that the channelway formed in the floor of the haulage unit is provided with a liner which reinforces the channelway and provides a seat for the draft bar.

18. The structure of claim 15 characterized in that the draft bar is provided at its outer free end with a solid bar insert to which the coupler means is secured.

References Cited by the Examiner

UNITED STATES PATENTS

| | | | |
|---|---|---|---|
| 485,999 | 11/1892 | Timby. | |
| 552,145 | 12/1895 | Richmond | 214—45 |
| 840,248 | 1/1907 | Pates | 214—53 |
| 976,170 | 11/1910 | Greene | 214—53 |
| 1,120,358 | 12/1914 | Aygarn. | |
| 2,257,365 | 9/1941 | Barrett. | |
| 2,408,862 | 10/1946 | Lisota | 298—17 X |

GERALD M. FORLENZA, *Primary Examiner.*

ROBERT G. SHERIDAN, *Examiner.*